Sept. 17, 1935. C. L. KNUTSON 2,014,971
SNAP FASTENER STUD
Filed Sept. 7, 1932

Inventor:
Carl L. Knutson,
by Emery, Booth, Varney and Townsend
Attys

Patented Sept. 17, 1935

2,014,971

UNITED STATES PATENT OFFICE 2,014,971

SNAP FASTENER STUD

Carl L. Knutson, Maywood, Ill., assignor to United-Carr Fastener Corporation, Cambridge, Mass., a corporation of Massachusetts Application September 7, 1932, Serial No. 631,979

3 Claims. (Cl. 24—73)

My invention aims to provide improvements in simple snap fastener studs adapted to be automatically locked in attached positions by a straight axial push.

In the drawing which illustrates a preferred embodiment of my invention:—

My invention relates particularly to the idea of providing simple locking means as an integral part of a fastener stud whereby the fastener may be attached to a structure by an axial push and which will lock the fastener in place against accidental removal once it is in position.

While the device, selected for illustration, is of a specific type, it should be understood that the invention is equally useful with any type of fastener device having two yieldable arms adapted to make snap fastening engagement with a socket or other suitable structure. My invention provides a simple and efficient locking means whereby the movable arms, for the shank of a stud, are locked in engagement with the socket or other suitable structure especially against axial disengagement. The locking means is so constructed that the fastener may be easily and quickly engaged with the socket or other structure by a simple push exerted upon the fastener stud in a direction axially relative thereto.

Referring now to the specific device illustrated, I have shown a conduit or like holding stud device made from a single piece of sheet metal bent to provide a conduit-engaging loop 1 which may be of a size to fit a conduit 2 in the form of a pipe, wire or the like. The fastening device is so constructed that a pair of thin, flat yieldable fingers or arms 3—3 are formed from the blank of flat sheet metal. These arms 3—3 comprise a stud shank and are arranged, preferably, in such a manner that one is opposite to the other with their inner flat faces facing each other. One arm extends from one side of the loop 1 (Figs. 3 and 4) and the other from the other side of the loop. The outer edges 4—4 are shaped to diverge relative to each other from the loop 1 (Figure 1) and then converge toward each other at their free ends. These edges provide means for guiding and holding the shank in engagement with a structure such as the part 5 shown in Figs. 1 and 2. The arms 3—3 pass through the aperture 6 in the part 5 and engage the wall surrounding the aperture as illustrated. Since the edges 4—4 diverge for a substantial distance they are adapted to engage and hold in parts of different thicknesses.

Figure 1:
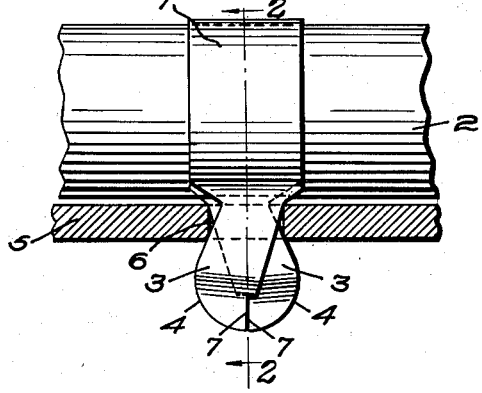
Figure 1 is an enlarged section through an installation showing, in locked position, one form of device embodying my invention.
Figure 2:
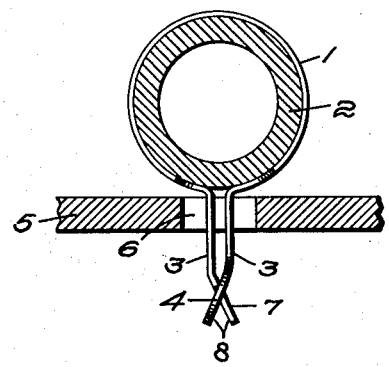
Fig. 2 is a section taken on the line 2—2 of Figure 1, the fastener being shown in elevation.

I have found it desirable to lock certain types of fasteners against removal by direct axial movement and in the structure illustrated the locking means (Figs. 1 and 2) comprises an abutment 7 formed on the inner edge of each of the arms 3—3 adjacent to its free end. This locking means is operable by cam means 8 provided by bowing the arms outwardly thereby bending the free end portions of the arms 3—3 toward each other (Figs. 3 and 4) so that when the arms are forced into the aperture 6 in the part 5 they will be moved toward each other flatwise whereby the arms will be in position relative to each other from the completion of the entering operation of the arms so that the locking portions 7—7 will be opposite each other, as shown in Figs. 1 and 2.

Figure 3:
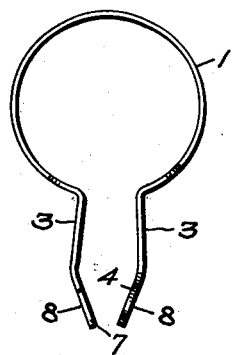
Fig. 3 is an end view of the fastener per se.
Figure 4:
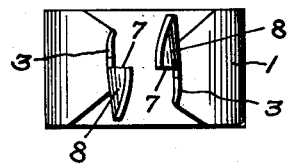
Fig. 4 is an under side plan view of the fastener shown in Fig. 3.
Figure 5:
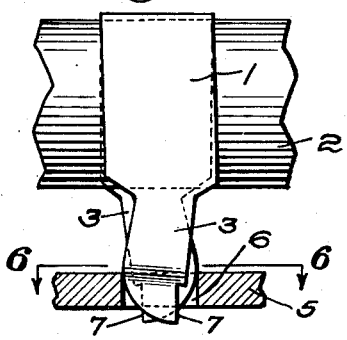
Fig. 5 is a view of the parts shown in Figure 1 as they appear during the attaching operation.
Figure 6:
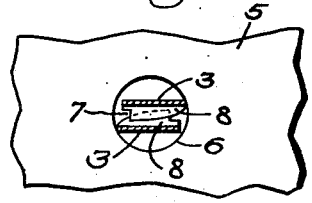
Fig. 6 is a section taken on the line 6—6 of Fig. 5.

It is a simple matter to attach applicant's fastener members so that they will hold the pipe, tubing or the like 2 in fixed position with relation to the part 5, because the arms may be spread apart flatwise to permit the conduit 2 to pass into the loop 1. After the conduit 2 is in the loop 1 the arms 3—3 are forced into the aperture 6 in the part 5 (Fig. 5) until the entire installation takes the position shown in Figure 1 where the fastener is locked against withdrawal from the aperture by a straight axial movement relative to the fastener. During the entering operation, as shown in Figs. 5 and 6, the arms 3—3 which are normally spaced away from each other, as shown in Fig. 3, first move toward each other flatwise due to the cam portions 8—8. Thus as the entrance progresses the converging portions of the edges 4—4 move the arms 3—3 relative to each other edgewise so that they cross and prevent engagement of the abutments 7—7 with each other during the attaching operation. Upon further attaching operation the cam portions 8—8 flatten somewhat to permit the arms to snap through the aperture thereby permitting edgewise movement of the arms away from each other, while at the same time bringing the abutments 7—7 into relative side-by-side position, as shown in Figs. 1 and 2. Thus the fastener is locked in engagement with the part 5 because the converging portions of the edges 4—4 engage the wall surrounding the aperture (Fig. 1) and the abutments 7—7 are in substantial engagement so that any stresses or strains which are exerted upon the conduit 2 or the fastener would only tend to move the arms 3—3 toward each other edgewise. This movement could be permitted only until the abutments 7—7 positively engage and thereafter no further movement of the fastener axially out of the aperture 6 could take place.

If and when it is desirable to remove the conduit, or the like, it is necessary to manipulate the arms 3—3 in such a manner that the abutments 7—7 are moved out of alignment so that the arms may move edgewise relative to each other.

My improved fastener is simple in construction, efficient in operation and is particularly desirable especially where it is necessary to provide a fastener which can be engaged in an aperture only by direct axial movement of the arms into the aperture. Furthermore, the construction of the fastener is important inasmuch as once it is locked in position the tubing, pipe, or the like, held in position, cannot become loosened until the fastener is moved because of the fact that the loop 1 almost entirely encircles the conduit 2.

While I have illustrated and described a preferred embodiment of my invention, I do not wish to be limited thereby, because the scope of my invention is best defined by the following claims.

1. A snap fastener stud member having a pair of thin, flat, oppositely positioned spring arms arranged with their flat faces toward each other shaped to make snap fastening engagement with cooperating socket means, each of said arms having a locking portion adapted to engage the locking portion of the other arm when the arms are completely engaged with a socket means thereby to prevent separation of the arms from the socket means by direct axial withdrawal movement, and said arms being bowed relative to each other on their outer flat faces and having their ends converging toward each other to provide cam means for cooperation with the socket means during a direct axial engaging operation to move said arms relative to each other in such a manner as to prevent locking engagement of the locking portions during the direct axial entering operation.

2. A one-piece sheet metal snap fastener stud member having a loop-shaped base, a shank comprising movable arms extending from the ends of said loop-shaped base and having outer edges shaped for detachably engaging the fastener to a suitable socket and integral locking means formed on the inner edges of said arms independently of the means for engagement with a socket and being operable to permit engagement of the stud with the socket and also being operable to interengage and prevent removal of the stud from the socket by direct axial movement.

3. A one-piece sheet metal snap fastener of the class described having a loop portion 1, a pair of movable arms 3—3 extending from said loop portion 1, one arm extending from one end of the loop and the other arm extending from the other end of the loop, locking portions 7—7 provided on said arms for locking the fastener to a supporting structure after it has been attached thereto, cam portions 8—8 formed by bending the arms toward each other and operable to prevent engagement of the locking means during the attaching operation of the fastener and means provided on the outer edges of the arms 3—3 for cooperation with the locking means to hold the fastener in locked engagement with a supporting structure.

CARL L. KNUTSON.